(12) United States Patent
De Amicis et al.

(10) Patent No.: US 8,434,509 B2
(45) Date of Patent: May 7, 2013

(54) TANK FOR CONTAINING LIQUIDS

(75) Inventors: Alberto De Amicis, Milan (IT); Antonio Tognoni, Milan (IT); Tommaso Cavallini, Como (IT)

(73) Assignee: Eurotecnica Melamine Luxemburg, Ittigen (CH)

( * ) Notice: Subject to any disclaimer, the term of this patent is extended or adjusted under 35 U.S.C. 154(b) by 608 days.

(21) Appl. No.: 12/618,166

(22) Filed: Nov. 13, 2009

(65) Prior Publication Data
US 2011/0113777 A1    May 19, 2011

(51) Int. Cl.
F04F 1/00    (2006.01)

(52) U.S. Cl.
USPC ............................... 137/209; 137/576

(58) Field of Classification Search .......... 137/206, 137/209, 565.17, 574, 576, 590
See application file for complete search history.

(56) References Cited

U.S. PATENT DOCUMENTS

| | | | | |
|---|---|---|---|---|
| 533,653 | A * | 2/1895 | Ladd-Davis | 137/1 |
| 3,710,549 | A * | 1/1973 | Nichols et al. | 261/36.1 |
| 3,732,668 | A * | 5/1973 | Nichols | 96/174 |
| 4,521,162 | A * | 6/1985 | Parkinson | 417/138 |
| 5,871,028 | A * | 2/1999 | Liu | 137/209 |
| 6,015,066 | A * | 1/2000 | Kimura et al. | 222/64 |
| 6,089,829 | A * | 7/2000 | Gestermann et al. | 417/118 |
| 6,148,847 | A * | 11/2000 | Mostowy et al. | 137/209 |
| 6,736,154 | B2 * | 5/2004 | Xu et al. | 137/14 |
| 2008/0197147 | A1 * | 8/2008 | Gruson | 222/61 |
| 2008/0304977 | A1 * | 12/2008 | Gaubert et al. | 417/86 |
| 2010/0175689 | A1 * | 7/2010 | Zillmer et al. | 126/90 R |

FOREIGN PATENT DOCUMENTS

| | | |
|---|---|---|
| DE | 33 14 491 A1 | 10/1984 |
| JP | 48-47158 | 7/1973 |
| JP | 6-94272 | 4/1994 |

OTHER PUBLICATIONS

Extended European Search Report issued Dec. 30, 2011, in Patent Application No. 10189646.2.

* cited by examiner

*Primary Examiner* — John Rivell
*Assistant Examiner* — Reinaldo Sanchez-Medina
(74) *Attorney, Agent, or Firm* — Oblon, Spivak, McClelland, Maier & Neustadt, LLP

(57) ABSTRACT

The present invention relates to a tank for the containment of a liquid, preferably a molten salt, said tank being associable to an aspiration pump of said liquid, wherein said tank comprises a bottom from which a lateral wall raises and wherein said aspiration pump requires a minimum level of liquid in said tank for operating, characterized in that it comprises at least an element occupying a volume and placeable inside said tank with at least a portion of said volume arranged at a height, with respect to said bottom, which is lower than said minimum level. The improved tanks of the present invention are suitable as storage tanks for liquids at elevated temperature such as molten salts to be used in heat storage systems in connection with solar power plants.

16 Claims, 11 Drawing Sheets

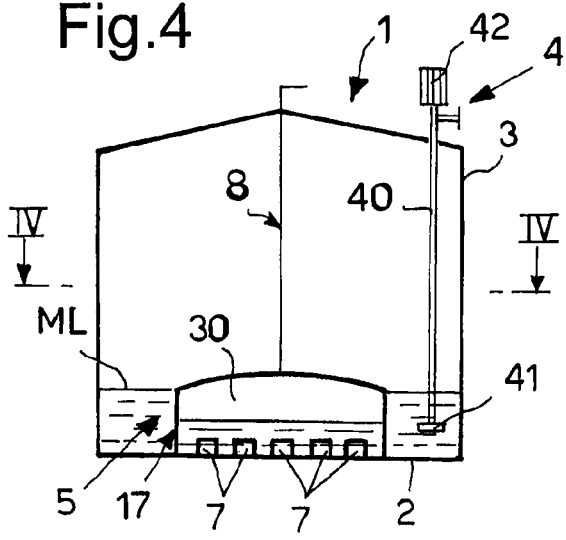
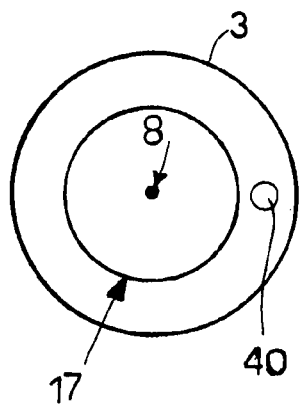
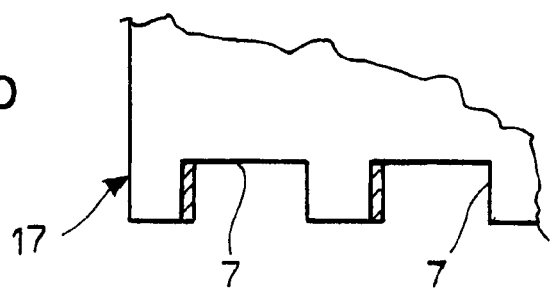
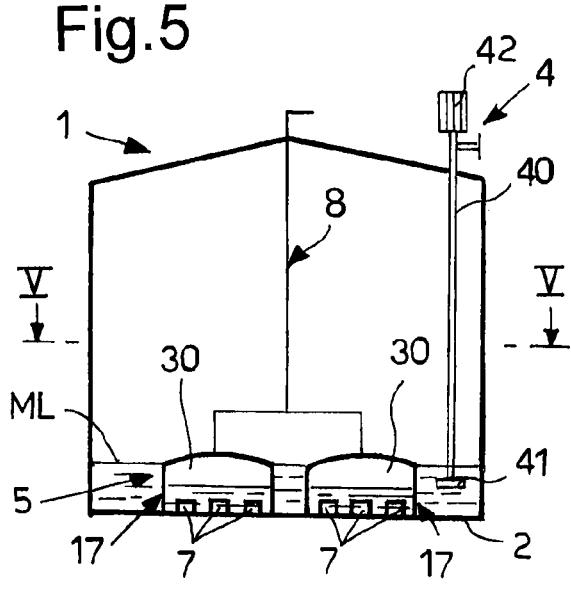
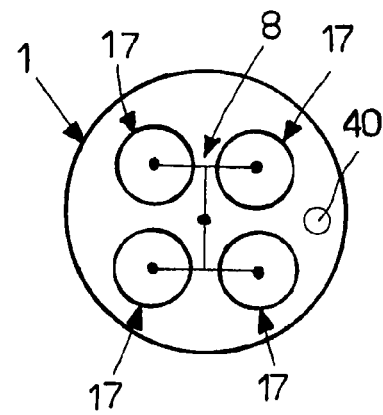

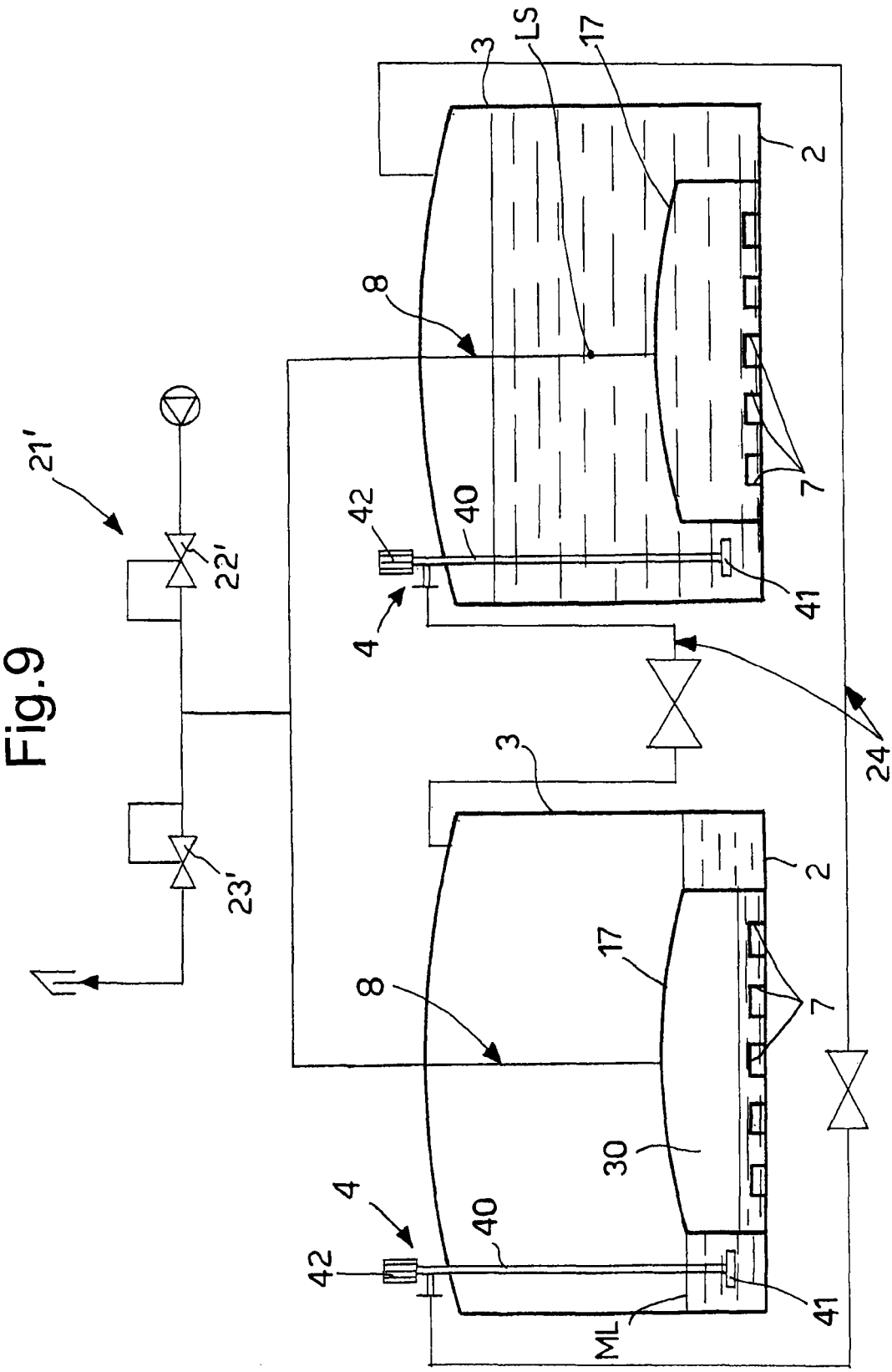

PRIOR ART

TANK FOR CONTAINING LIQUIDS

FIELD OF THE INVENTION

The present invention relates to an improved tank for containing liquids. Particularly, the present invention relates to an improved tank for containing molten salts especially suitable for use as a heat storage systems in connection with solar power plants.

BACKGROUND OF THE INVENTION

The use of renewable energy sources has become of paramount importance to develop our planet in a sustainable way.

Among the renewable sources, the recovery of energy radiated from the sun in order to produce electricity founds today more and more applications which can be broadly divided into photovoltaic applications and thermal applications.

Among the thermal applications of the solar energy the development of concentration solar power (CSP) plants is one of the field of technology development. The CSP plants concentrate the energy radiated from the sun by means of mirrors in order to heat a fluid at a temperature suitable to produce, in an heat exchange device, steam which in turn is used to produce electric power through a turbine and generator system.

Since the sun radiation is available during daylight only, different systems have been developed in order to store the energy recovered from the sun and use it during night time in order to ensure a wider timing of power availability according with the electric grid requirements.

In the state of the art the most common method to store the captured sun radiation energy is to heat a mass of molten salts, mostly a mixture of nitrates, during the day, while using these hot molten salts, either directly or indirectly, for producing steam and therefrom electric power.

The CSP plants use two different schemes to exploit the energy recovered from the sun radiation: in the first scheme (FIG. 10) the solar energy is transferred by heating an intermediate fluid, named Heat Transfer Fluid (HTF), generally a mixture of hydrocarbons, which is used during the day both to produce steam and to heat the stored molten salts mass increasing its temperature; in the second scheme (FIG. 11) the solar energy is directly transferred to the molten salts mass which is in part used to produce steam and in part used to store heat to be used at night time.

The heat storage system used to store the molten salts usually comprises one or more couples of tanks (named hot and cold salt storage tanks).

During molten salts heating, the same are transferred from the cold tank to the hot one, while, when the stored energy is recovered, the molten salts flow from the hot tank to the cold tank.

According to the different CSP plants schemes the cold tank operates within a temperature range varying from 270° C. to 440° C., while the hot tank temperature range varies from 350° C. to 560° C., with a temperature difference between the two tanks in the range of 70° C. to 200° C.

As an alternative to the two-tank storage system, thermocline storage systems can be used. A thermocline storage system is a single-tank system containing both the hot and cold fluid. This type of system relies on thermal buoyancy to maintain thermal stratification and discrete hot and cold thermal regions inside the tank.

CSP plants are today sized to produce electricity with an electric power output which ranges from 10 MW to 500 MW. Since the efficiency of the power generation system ranges from 30% to 50% and it is requested to produce electricity for 6 or 12 hours when the sun is not available, CPS plants need to store an amount of thermal energy in the range of 100 MWh to 20,000 MWh.

A typical thermal storage system in CSP plants being built today is in the range of 1,500 MWh.

In the case of a two-tank thermal storage system, assuming a temperature difference of 100° C. between the cold and hot tanks and considering the specific heat of typical nitrates mixture used as heat storage medium, it follows that a storage of more than 35,000 tons of molten salts is required.

Accordingly, the storage tank diameter is in the range of 20 to 70 meters while the tank height is in the range of 7 to 18 meters.

The molten salts storage tanks must be designed in order to avoid any possible leak of molten salts. This is achieved, inter alia, by avoiding any kind of connections, nozzles or the like below the maximum level which can be reached by the molten salts mass inside the tank. Accordingly, all connections are arranged on the upper part of the tank, preferably on its roof.

Moreover, the tanks need to be designed with their bottom being flat in order to avoid undesired stress concentrations.

Since no connections are present below the maximum molten salts mass level, the molten salts are generally transferred, either when heating or cooling, by means of aspiration pumps, preferably vertical centrifugal pumps, having the impeller arranged near the bottom of the tank and a shaft of suitable length protruding from the top of the tank.

In order to maintain a stable operation and to avoid cavitation phenomena, aspiration pumps, particularly centrifugal pumps, require a minimum positive suction head, that is a minimum liquid level at the pump suction side, namely over the pump impeller.

Accordingly, a minimum level of molten salts must always be present in the tank for properly operating the pumps. This results in the unavailability for storing and retrieving heat of the amount of molten salts needed to maintain the minimum liquid level required.

Typically, a minimum level in the range of 0.5 meters to 1.4 meters must be permanently left in a tank. Consequently, in the case of a 50 MW CSP plant with a heat storage system comprising two 38 meter-diameter tanks, it would be necessary the purchase of approximately 1,000 to 3,000 tons of nitrates salts mixture, which will not be available for heat transfer purpose.

Besides the burden on the investment, the storage of such an amount of unusable chemicals inevitably entails an undesired, very negative environmental impact due to the high consumption of energy and raw materials for their production, transportation and melting on an industrial scale.

The problem of minimizing the amount of liquid which cannot be sucked by a pump, namely a vertical pump, from a tank or vessel has been addressed with a variety of methods. With reference to FIG. 12, in one of this methods the bottom (B) of a tank (T) is provided with a sump area (SA) which acts as a priming reservoir of the pump (P). However, this known method cannot be applied to tanks working at high temperatures, such as the molten salts tanks employed in CSP plants, due to several disadvantages and difficulties to combine the thermal expansion which affect the metallic walls and bottom of the tank with insulation material of foundation which is required to avoid the concrete to reach a too high temperature.

The use of a tank having a non-flat bottom, as an example a bottom shaped so as to define a sump area, must in principle be avoided in order to allow, without any constraint, the radial expansion of the tank bottom when the tank is heated up to a temperature above about 180° C.

An objective of the present invention is to overcome the above-mentioned drawbacks of the known art.

Particularly, it is a scope of the present invention to provide an improved tank for liquids in which it is minimized the unusable amount of liquid that must be present in the tank for ensuring proper operation of an aspiration pump.

It is also a scope of the present invention to provide an improved tank for liquids which allows to maximize the amount of liquid which can be extracted therefrom by means of an aspiration pump while ensuring the proper operation of the latter.

In particular, it is a scope of the present invention to minimize the amount of molten salts (liquid) unusable as heat transfer and storage medium while assuring the proper operation of the aspiration pump used to suck them from the tank.

A further scope of the present invention is also the reduction of the environmental impact entailed by the production, melting, loading, storage and disposal of large amounts of chemicals such as molten salts.

SUMMARY OF THE INVENTION

It is an object of the present invention a tank for the containment of a liquid, preferably a molten salt, said tank being associable to an aspiration pump of said liquid, wherein said tank comprises a bottom from which a lateral wall raises and wherein said aspiration pump requires a minimum level of liquid in said tank for operating, characterized in that it comprises at least an element occupying a volume and placeable inside said tank with at least a portion of said volume arranged at a height, with respect to said bottom, which is lower than said minimum level.

It is a further object of the present invention a heat storage system comprising at least one tank as above-defined.

It is another object of the present invention a plant comprising two or more, the same or different, of the above-defined tanks.

It is a further object of the present invention a method of storing heat in a tank as above-defined.

It is a further object of the present invention a method of storing heat in a plant as above-defined.

BRIEF DESCRIPTION OF THE DRAWINGS

In order to make clearer the explanation of the innovative principles of the present invention and the advantages thereof over the prior art, with the help of the attached drawings several possible embodiments applying such principles will be illustrated by way of example. In the drawings:

FIG. 4 is a schematic vertical section view of a tank according to the present invention in which the element is a gas cushion defined by a secondary tank connected to a gas supply and vent system (gas supply and vent system not shown);

FIG. 4*a* is a schematic horizontal section view of the tank of FIG. 4 along the plane IV-IV;

FIG. 4*b* is an enlargement of a detail of an opening in the bottom of the secondary tank of FIG. 4;

FIG. 5 is a schematic vertical section view of a tank according to the present invention comprising four elements each of which is a gas cushion defined by a correspondent secondary tank, the four secondary tanks being connected to a common gas supply and vent system;

FIG. 5*a* is a schematic horizontal section view of the tank of FIG. 5 along the plane V-V;

FIG. 9 is a schematic vertical section view of a plant comprising two tanks as the one of FIG. 8*a* both connected to a common gas supply and vent system;

DETAILED DESCRIPTION OF THE INVENTION

Figure 1:
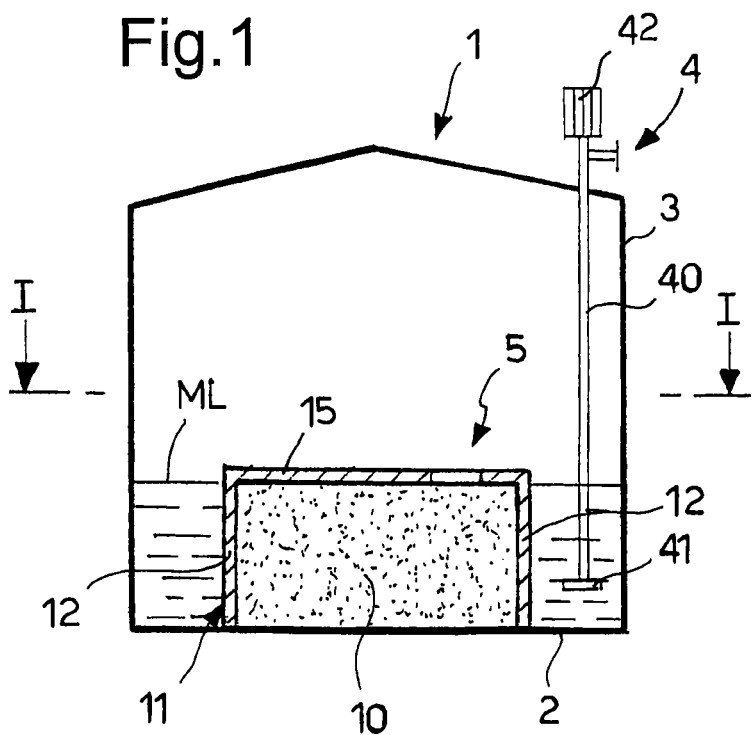
FIG. 1 is a schematic vertical section view of a tank according to the present invention in which the element is a containment body including a mass of inert material.

The tanks for the containment of liquids according to the present invention will be described with reference, by way of example, to their application as heat storage tanks or systems used in connection with solar concentration power plants.

In this type of application, the liquid contained in the tank is a molten salt, generally a mixture of nitrates, which is used as a medium to store the heat recovered from the sun radiation. Therefore, in the following description the term "liquid" and the expression "molten salts" will be alternatively used.

It will be clear, however, for a skilled artisan in the field that the advantages of the present invention also extend to other types of applications, particularly to any application involving the transfer of liquids in and out of a tank, wherein the liquids are extracted from the top of the tank by means of an aspiration pump that, in order to operate, requires the maintenance of a minimum level of liquid inside the tank. The skilled artisan will also recognize that the present invention is particularly advantageous when the tank is used for the storing liquids at elevated temperature, particularly at temperature higher than about 180° C.

With reference to the figures, a main tank 1 for the containment of liquids according to the present invention comprises a bottom 2, the profile of which is flat, and a lateral wall 3 which raises from the bottom 2.

The main tank 1 is associated with an aspiration pump 4 for the transfer of the molten salts outside the tank 1, from the top of latter. Preferably, the pump 4 is a vertical centrifugal pump. Another type of aspiration pump 4 which can be used is a screw pump mounted on the top of the tank 1 and having a suction pipe submerged in the liquid which aspires from the proximity of the bottom 2 of the tank 1.

In order for the pump 4 to properly operate, particularly to avoid cavitation phenomena, it is essential that the level of the molten salts inside the main tank 1 is above the "minimum positive suction head" of the pump (hereinafter named MPSH). In the case of a vertical centrifugal pump, the pump impeller must be maintained sufficiently submerged in the molten salts.

In the attached figures the main tank, the aspiration pump and the connections thereof are only schematically shown, being known to a person skilled in the art. In particular, in the attached figures the pump 4 is schematically shown as a vertical centrifugal pump having a vertical shaft 40 that has, at its lower end, an impeller 41 and that is connected, at its top end, to an electric motor 42.

The main tank 1 comprises at least one element 5 which is placed inside the main tank 1, in proximity to its bottom 2. According to the present invention, at least part of the volume of the element 5 must be arranged at a height, with respect to the bottom 2, which is lower than the "minimum level" (hereinafter also named "ML") of molten salts needed to guarantee the MPSH over the pump impeller.

The presence of the element 5 makes unavailable part of the volume of the main tank 1 to the molten salts in proximity to the bottom 2, when the liquid level approaches the ML. Since the element 5 occupies part of the volume of the main tank 1 which is at a height, with respect to the bottom 2, lower than the ML of molten salts needed to guarantee the MPSH over the pump impeller, the molten salts will be caused to occupy the remaining volume of the main tank 1 which is necessarily at a height, with respect to bottom 2, above said ML. In this way, a volume of molten salts equal to the volume of the element 5 is displaced and made available to the pump 4 for being extracted from the main tank 1.

According to the present invention, the surface area ($A_e$) in any horizontal section of the element 5, that is in cross-section with respect to the vertical axis of the main tank 1, must be smaller than the surface area in any horizontal section of the main tank 1. Generally, the area $A_e$ of the element 5 is sized according to the constraints of the tank design, such as, but not limited to, the presence of pumps, spargers, thermowells, resistors, heating coils.

The surface area in the horizontal section of the main tank 1 which is not occupied by the element 5 will be hereinafter also referred to as pump area.

In a first embodiment of the present invention, the element 5 comprises one or more masses made of a material which is inert with respect to the molten salts—or any other liquid—present in the main tank 1.

The density of the inert mass is higher than that of the liquid so that the mass would not float on the liquid.

By the term "chemically inert mass" it is intended a mass of material which, when contacted with the liquid contained in the tank, does not alter the properties of the liquid: neither chemical reactions nor dissolutions nor mixing and erosion phenomena occur to such an extent that it makes the liquid unsuitable for its use.

The type of inert material to be used depends on the characteristics of the liquid contained in the main tank 1. In the case of the molten salt used as a heat storage medium, the selection of the inert material must address issues like its chemical and thermal stability at high temperatures, its mechanical strength resistance to crushing and the like.

Examples of inert materials that can be used according to the present invention are: granite rock, iron ore pellets (taconite), limestone, marble, quartzite, witherite, barite, bauxite, illmenite, anhydrite, carborundum, apatite, scheelite, cassiterite and silica sand.

It has been found that after testing the chemical and mechanical characteristics of the above-mentioned inert materials and considering their availability and cost, the preferred inert materials to be used, alone or as a mixture, in the present invention are: iron ore pellets (taconite), limestone, marble, quartzite and silica sand.

In a further embodiment of the present invention (FIGS. 1-1a), the element 5 comprises a containment body 11, having any shape, containing a mass 10 of one or more of the above-mentioned inert materials.

Preferably, the containment body 11 is provided with at least an opening 13 for putting in communication the inner part of the containment body 11, that is the chamber enclosed by the containment body 11, with the inner part, that is the inner volume, of the main tank 1, thus allowing free flow of the molten salts between the inside of the containment body 11 and the inner volume of the main tank 1. Preferably, said opening 13 is placed on the top surface 15 of the containment body 11.

The lateral confinement or walls 12 of the containment body 11 can be made of a metal sheet of a suitable thickness to confine the inert mass.

The lateral confinement or walls 12 can be made of a material selected among carbon steels and alloy steels in accordance with the temperature conditions and salts composition in the main tank 1.

The metal sheet of the lateral confinement or walls 12 can be shaped, for example, as a circumferential dike, as a segmental baffle, or as a combination of the two, as well as any other polygonal or curve form which could be more suitable to address other constraints in the tank design, such as, but not limited to, the space necessary for the installation of pumps, spargers, thermowells, resistors, or heating coils.

The height of the lateral confinement or walls 12 shall be sized according to the MPSH over the pump impeller required by the pump manufacturer. In a heat storage tank having a diameter ranging from 20 to 70 m, a height ranging from 7 to 18 m, the height of the lateral confinement or walls 12 is preferably between 0.3 and 2 m, most preferably between 0.5 and 1 m.

Preferably, the metal sheets of the lateral confinement 12 is anchored to the bottom 2 of the main tank 1 by means of welding, either spot or continuous, or by means of any other technique known in the art for mechanical construction.

The containment body 11 may have a top surface or confinement 15, such as a mesh steel grid, a pierced metal sheet or a combination of the two in order to confine, on the upper side, the inert material mass 10.

The top surface or confinement 15 offers the advantage of enabling the use of inert materials having density lower than that of the molten salts or other liquid contained in the tank 1.

As said, the top surface or confinement 15 can be provided with at least one opening 13 that puts in communication the inner chamber of the containment body 11, inside which the inert material mass 10 is contained, and the inner volume of the main tank 1 containing the molten salts.

The opening 13, which may be covered by a steel grid 6 having a suitable thickness and mesh, ensures that the pressure generated by the molten salts hydrostatic head in the main tank 1 is distributed on both the inner and outer sides of the lateral confinement 12, thus allowing to use a lateral confinement 12 made of a thinner metal sheet.

The top surface or confinement 15 can be made of a material selected among carbon steels and alloy steels in accordance with the tank temperature conditions and salts composition.

The top surface or confinement 15 is connected to the lateral confinement 12 by means of welding, either spot or continuous, or by means of any other technique known in the art for mechanical construction.

The bottom of the containment body 11 can coincide with the correspondent portion of the bottom 2 of the main tank 1, alternatively it can be made of a separate and different bottom plate.

According to a preferred embodiment of the invention (not shown in the drawings), the containment body 11 is filled with two or more different layers of a mass 10 of inert materials. Preferably, the containment body 11 is filled with a first layer of silica sand and a second layer of crushed quartzite deposited on the top of the first layer.

In a further possible embodiment of the present invention (FIG. 2) the element 5 comprises at least one containment body 11 filled with a fluid, such as an inert gas or liquid. The containment body 11 does not have openings that put its inner volume in communication with the mass of molten salts contained in the main tank 1.

The fluid inside the containment body 11 can be, for example, nitrogen or another inert gas which is supplied by an external gas supply and vent system connected to the containment body 11.

Alternatively, the containment body 11 can be directly connected to the atmospheric air (as depicted, for example, in FIG. 2) or to the internal atmosphere of the tank 1, which is formed by the gas phase (e.g. an inert gas) above the molten salts level.

Figure 2:
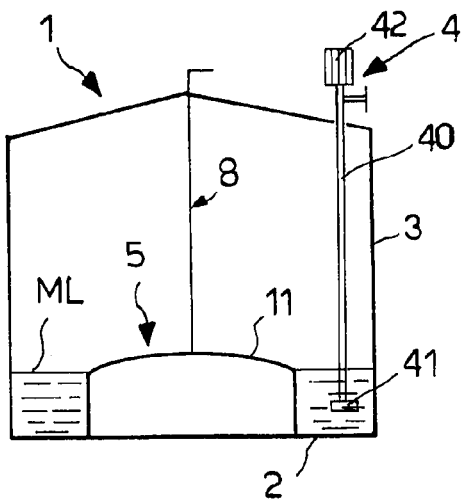
FIG. 2 is a schematic vertical section view of a tank according to the present invention in which the element is a containment body (secondary tank) filled up with a gas.

The containment body 11 can be a vessel or a second tank (hereinafter, also referred to as "secondary tank") suitably fixed to the bottom 2 and occupying a lower portion of the main tank 1. In FIG. 2, the containment body 11 is depicted as a secondary tank.

Preferably, the vessel or secondary tank is anchored to the bottom 2 of the main tank 1 by means of welding, either spot or continuous, or by means of any other technique known in the art for mechanical construction.

Preferably, a series of containment bodies 11 having variable size is employed in a main tank 1, the number and size of containment bodies 11 depending on the desired amount of molten salts that has to be displaced above the MPSH over the pump impeller required by the pump manufacturer.

Preferably, the vessels or secondary tanks used as containment bodies 11 have a cylindrical shape.

The diameter or the equivalent diameter of a cylindrical vessel is preferably between 0.4 m and 2.5 m, most preferably between 0.5 and 1.5 m.

The height of a cylindrical tank is preferably between 0.3 m and 2 m, most preferably between 0.5 m and 1 m.

When the containment body 11 is a secondary tank, its walls may be reinforced by means of beams, circumferential (internal or external) rods and by any other means or technique known in the art for mechanical construction. The roof of the tank may be supported internally by supporting means or adopting any other technique known in the art for mechanical construction suitable to support it and to reduce the roof thickness.

In a further possible embodiment of the present invention (FIGS. 3-9) the main tank 1 comprises at least one element 5 which consists of a gas cushion 30 having a controllable volume.

The gas cushion 30 inside the main tank 1 can be provided for in different embodiments.

Figure 3:
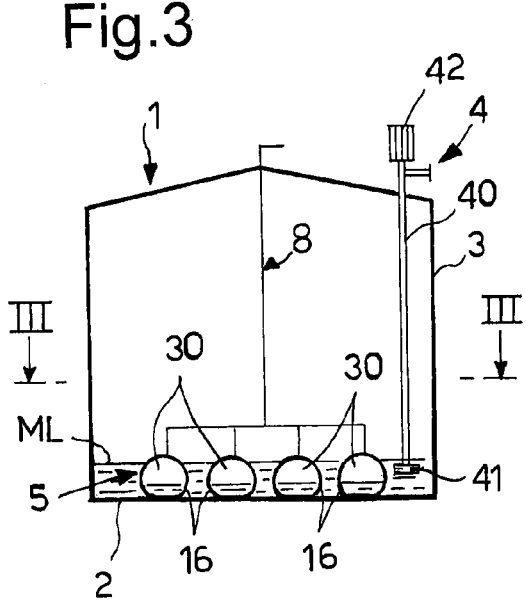
FIG. 3 is a schematic vertical section view of a tank according to the present invention in which the element is a gas cushion defined by some vessels connected to a gas supply and vent system.
Figure 3A:
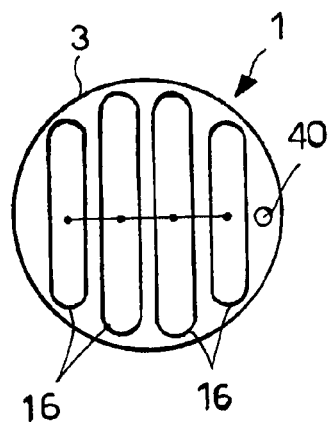
FIG. 3*a* is a schematic horizontal section view of the tank of FIG. 3 along the plane III-III.
Figure 3B:
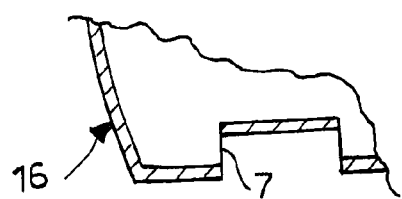
FIG. 3*b* is an enlargement of a detail of an opening in the bottom of the containment bodies of FIG. 3.
Figure 6:
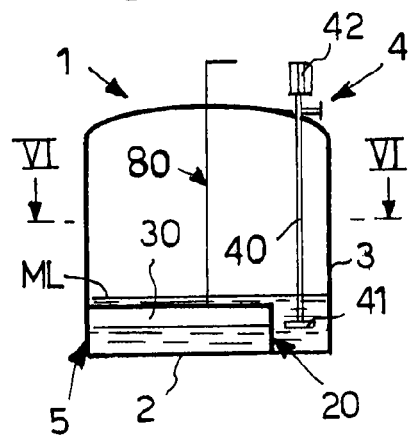
FIG. 6 is a schematic vertical section view of a tank according to the present invention in which the element is a gas cushion defined by a compartment which is connected to a gas supply and vent system.
Figure 6B:
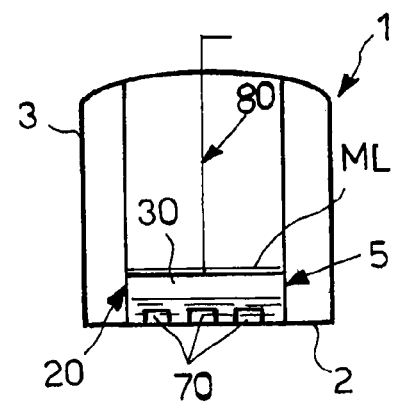
FIG. 6*b* is a schematic vertical section view along the plane B-B of FIG. 6*a*.
Figure 6A:
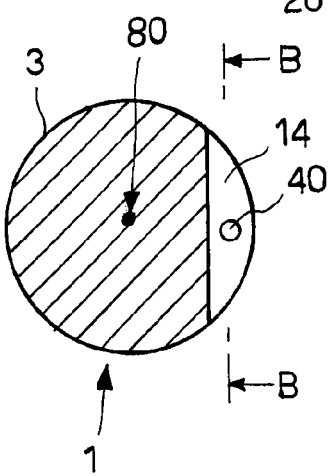
FIG. 6*a* is a schematic horizontal view of the tank of FIG. 6 along the plane VI-VI.
Figure 6C:
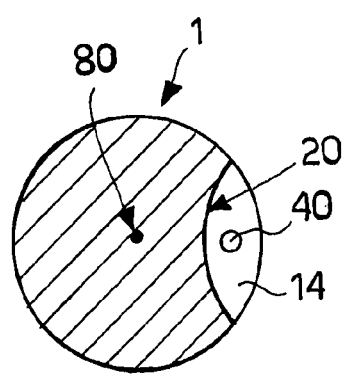
FIGS. 6*c* to 6*f* are schematic horizontal section views of a tank similar to that of FIG. 6 each view showing a compartment having an alternative form.
Figure 6D:
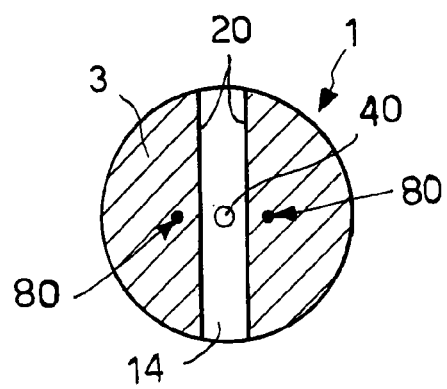
Figure 6E:
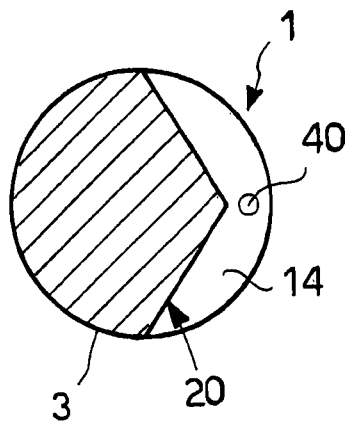
Figure 6F:
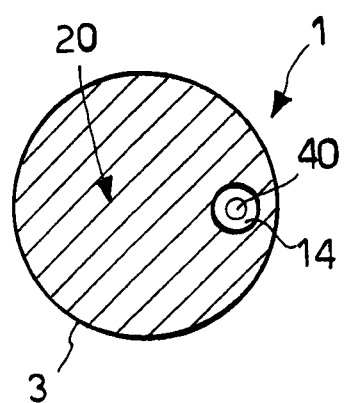

In a first embodiment, the gas cushion 30 is defined by one or more vessels 16 (FIGS. 3, 3a and 3b) or one or more secondary tanks 17 (FIGS. 4, 4a, 4b, 5 and 5a) placed inside the main tank 1, in proximity to its bottom 2.

The vessels 16 or secondary tanks 17 are provided with one or more openings 7 in their lower part, close to the bottom 2 of the main tank 1, which enable the passage of the molten salts in and out of the vessels 16 or secondary tanks 17.

The vessels 16 or secondary tanks 17 are at least partially filled with an inert gas. To this end, the vessels 16 or secondary tanks 17 are connected, in their upper parts, for example through a pipe 8, to an inert gas (e.g. nitrogen) supply and vent system.

The nitrogen or inert gas supply and vent system is operated in order to ensure that the pressure inside the vessels 16 or secondary tanks 17 equals or exceeds the pressure of the gas phase inside the main tank 1.

The vessels 16 or secondary tanks 17 may be anchored to bottom 2 of the main tank 1 by means of welding, either spot or continuous, or by means of any other technique known in the art for mechanical construction.

The size of the vessel 16 or secondary tank 17 is chosen according to the constraints in the tank design, such as, but not limited to, the presence of pumps, spargers, thermowells, resistors, heating coils.

Preferably, the vessels 16 have a tubular form with a diameter between 0.3 m and 2.5 m, most preferably between 0.5 m and 1.5 m.

The secondary tanks 17 have a height sized according to the MPSH of the pump impeller required by the pump manufacturer. Preferably, the height of the secondary tank 17 is between 0.3 m and 2.5 m, most preferably between 0.5 m and 1.5 m.

The openings 7, which allow the free flow of the molten salts contained in the main tank 1 in and out of the vessels 16 or secondary tanks 17 may be of a rectangular, circular or any other shape. The height of the openings 7, measured from the bottom 2 of the main tank 1 is preferably between 0.01 m and 1 m, more preferably between 0.02 m and 0.5 m and most preferably between 0.04 m and 0.12 m.

The vessel or tank material can be selected among carbon steels and alloy steels in accordance with the temperature conditions in the main tank 1 and the salts composition.

When the gas cushion 30 is defined by a secondary tank 17, the roof of the secondary tank 17 may be supported internally by suitable means or adopting any technique known in the art for mechanical construction suitable to support it and to reduce the roof thickness.

The secondary tank 17 may be anchored to the bottom 2 of the molten salts main tank 1 by means of welding, either spot or continuous, or by means of any other technique known in the art for mechanical construction.

The walls of the secondary tank 17 may be reinforced by means of beams, circumferential (internal or external) rods and by any other means or technique known in the art for mechanical construction.

The secondary tank 17 may or may not have a bottom plate different from the bottom plate of the main tank 1.

In a second alternative embodiment, the gas cushion 30 is defined by one or more compartments 20 (FIGS. 6, 6a to 6f) placed inside the main tank 1, in proximity to its bottom 2.

Each compartment 20 is provided with one or more openings 70 in its lower part, close to the bottom 2 of the main tank 1, which enable the passage of the molten salts in and out of the compartment 20.

The compartment 20 is at least partially filled with an inert gas. To this end, the compartment 20 is connected, in its upper part, for example through a pipe 80, to an inert gas (e.g. nitrogen) supply and vent system (the supply and vent system is not shown in FIGS. 6, 6a to 6f).

The nitrogen or inert gas supply is operated in order to ensure that the gas pressure inside the compartment 20 equals or exceeds the pressure of the gas phase inside the main tank 1.

The size of the compartment 20 is chosen according to the constraints in the tank design, such as, but not limited to, the presence of pumps, spargers, thermowells, resistors, heating coils.

The compartment 20 has a height sized according to the MPSH of the pump impeller required by the pump manufacturer, preferably between 0.3 m and 2 m, most preferably between 0.5 m and 1.2 m.

The compartment 20 may or may not have a bottom plate different from the molten salts tank bottom plate (bottom 2).

The lateral confinement walls of the compartment 20 may be a segmental baffle or any other polygonal or circular or curve profile as the constraints on the molten salts main tank will dictate.

In a preferred embodiment, the compartment 20 occupies the whole tank bottom area (FIG. 6f), leaving a portion free for accommodating the pump (pump area 14).

Figure 7A:
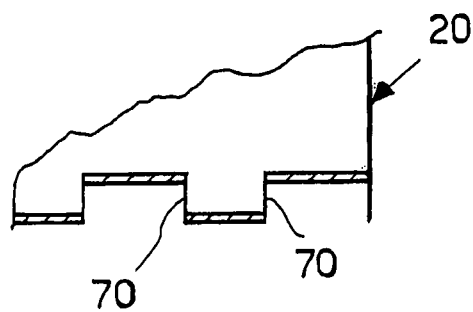
FIGS. 7*a* and 7*b* are enlargements of a detail of an opening in the bottom of the compartment shown in FIGS. 6, 6*a* to 6*f*.
Figure 7B:
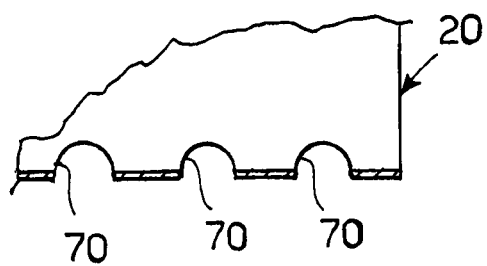

The openings 70, which allow the free flow of the molten salts in and out of the compartment 20 may be of a rectangular, circular or any other shape (FIGS. 7a and 7b). The height of the openings 70, measured from the bottom 2 of the main tank 1 shall be preferably between 0.01 m and 1 m, most preferably between 0.02 m and 0.5 m and even most preferably between 0.04 m and 0.12 m.

The vessel or secondary tank material is selected among carbon steels and alloy steels in accordance with the temperature conditions in the main tank 1 and the salts composition.

The roof of the compartment 20 may be supported internally by means of beams or adopting any other technique known in the art for mechanical construction suitable to support it and to reduce the roof thickness.

The compartment 20 may be anchored to the bottom 2 of the main tank floor by means of welding, either spot or continuous, or by means of any other technique known in the art for mechanical construction.

The confinement walls of the compartment 20 may be reinforced by means of beams, circumferential rods, internal or external and by any other mean or technique known in the art for mechanical construction.

Figure 8:
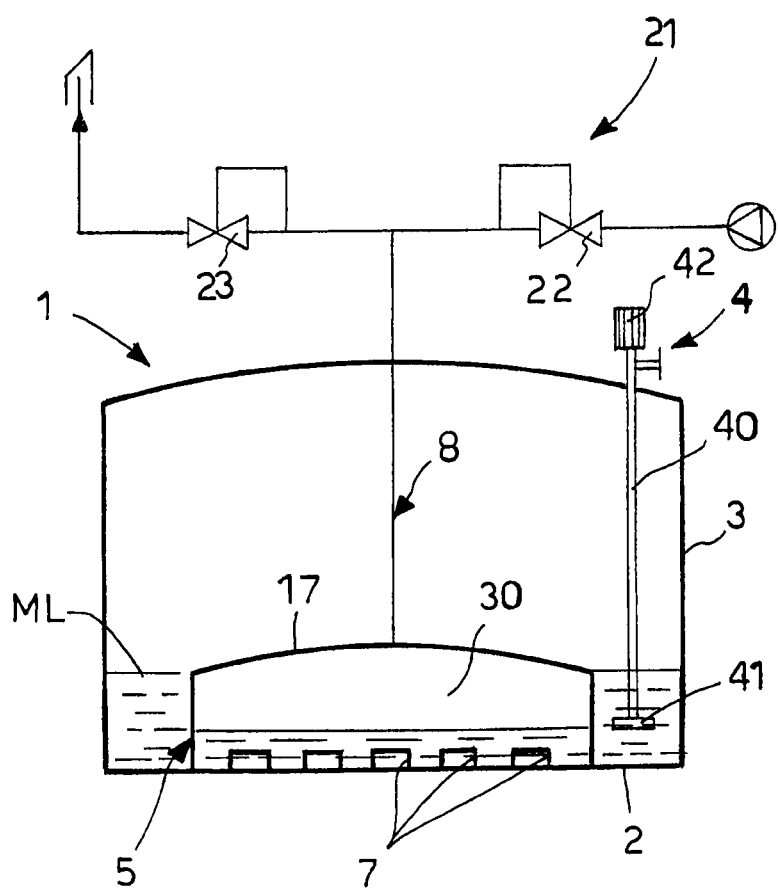
FIGS. 8, 8*a* and 8*b* are schematic vertical sections view of a tank according to the present invention in which the element is a gas cushion defined by means of a secondary tank connected to a gas supply and vent system, each view showing different possible operating configurations.
Figure 8A:
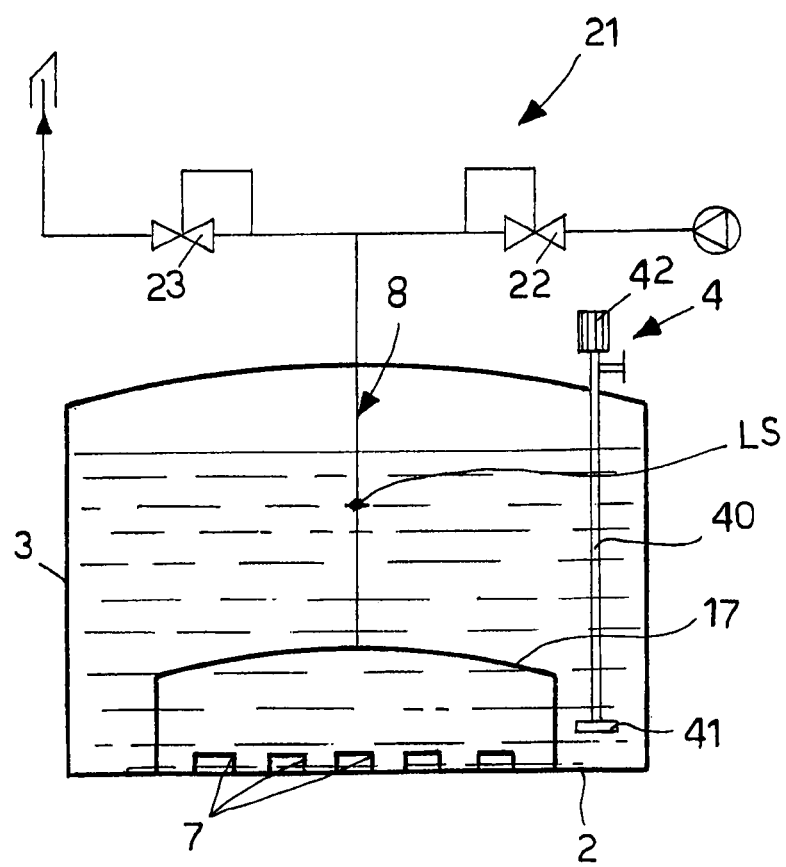
Figure 8B:
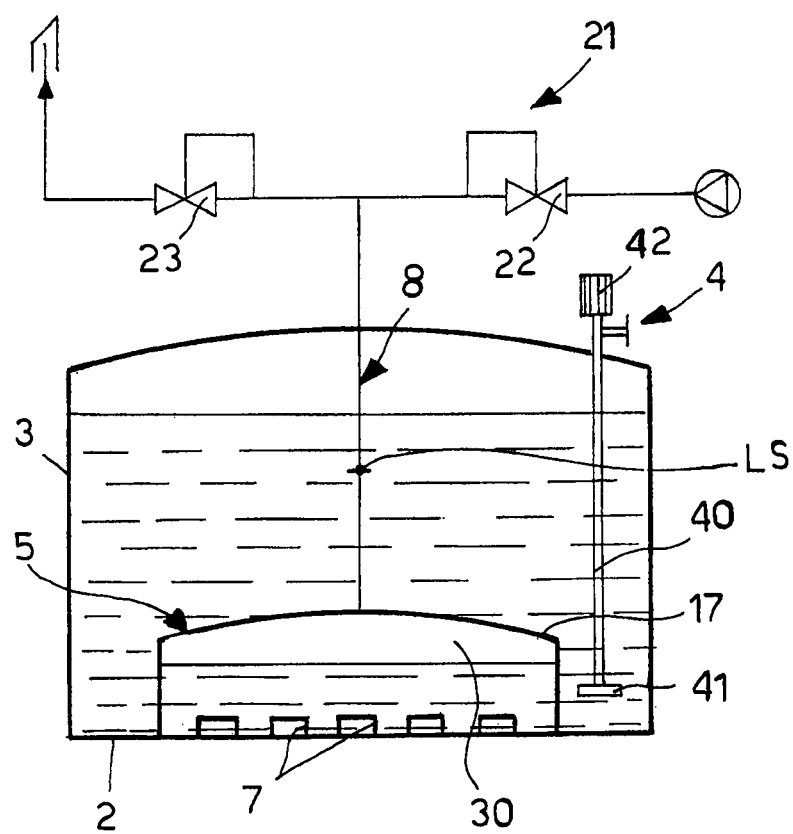
Figure 10:
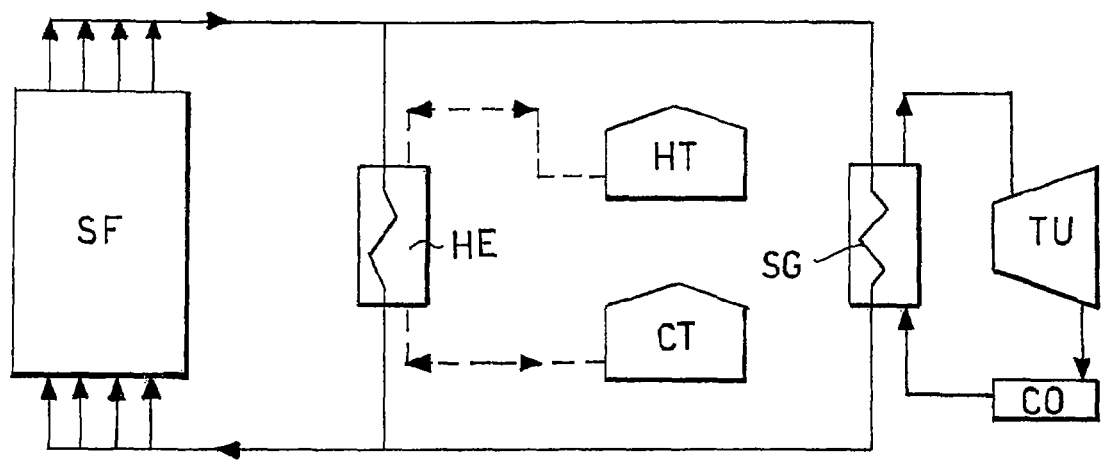
FIG. 10 is a schematic representation of a prior art CSP plant in which the energy recovered from the sun radiation is used both to produce steam and to heat a molten salts mass by means of a Heat Transfer Fluid (HTF); in this figure: HT is a hot salts tank, CT is a cold salts tank, HE is a oil to salts heat exchanger, SF is a solar field, SG is a steam generator, TU is a steam turbine used for producing electric power, CO is a condenser of the turbine exhaust steam.
Figure 11:
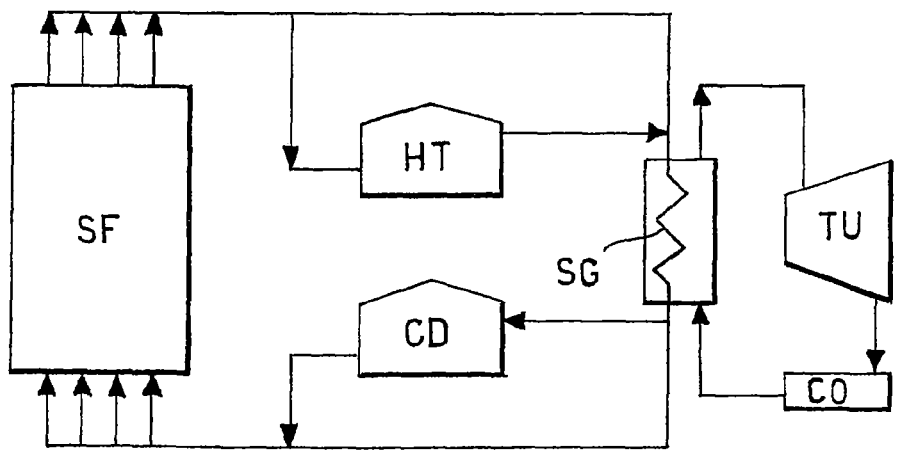
FIG. 11 is a schematic representation of a prior art CSP plant in which the energy recovered from the sun radiation is directly transferred to a molten salts mass; in this figure: HT is a hot salts tank, CT is a cold salts tank, SF is a solar field, SG is a steam generator, TU is a steam turbine used for producing electric power; CO is a condenser of the turbine exhaust steam.
Figure 12:
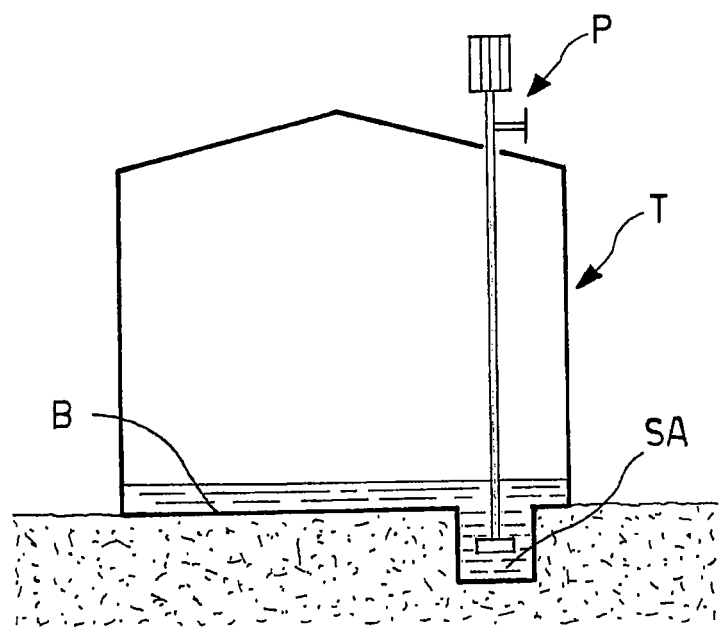
FIG. 12 is a schematic representation of a prior art tank having a bottom shaped so as to define a sump area as a priming reservoir for an aspiration pump.

The scheme of a possible nitrogen or other inert gas supply and vent system 21 suitable for use in the present invention is schematically outlined in FIGS. 8, 8a and 8b, with particular reference to the embodiment comprising one or more inner secondary tanks 17, being it the same for the embodiments comprising vessels 16 or compartments 20 or a combination thereof.

As stated above, each inner secondary tank 17 has, at its bottom side, openings 7 through which the molten salts flow from the main tank 1 into the inner secondary tank 17 and vice versa, while it is connected at its top side with a inert gas supply and vent system 21 by means of which a gas cushion 30 of variable volume, forming the element 5, is generated and controlled.

The supply and vent system 21 of the inert gas connected to the secondary tank 17 comprises at least two pressure control valves regulators (controllers) 22 and 23, or any other suitable controlling device according to the technique known in the art of process control engineering and instrumentation engineering.

A first controller 22 will admit nitrogen into the secondary tank 17 in order to generate and maintain inside the secondary tank 17 a first threshold pressure, which is close to the value of the pressure generated by the molten salts level corresponding to the level thereof required to maintain the minimum positive suction head (MPSH) over the pump impeller. This first threshold pressure is hereinafter named first pressure set point.

The second controller 23 will vent nitrogen out of the secondary tank 17 when the pressure inside it reaches a second threshold pressure (second pressure set point). The second pressure set point can vary from a minimum value (FIG. 8a), corresponding to a pressure slightly above the first set point (0.01 bar g or more), to a maximum value, higher than the pressure generated by the molten salts level corresponding to the maximum level in the molten salts main tank 1 (FIG. 8b).

By varying the value of the second pressure set point, it can be determined the volume of the gas cushion 30 inside the secondary tank 17 as a function of the amount of molten salts contained in the main tank 1. Hence, by setting the first and second pressure set points it is possible to control the volume of the element 5, that is of the gas cushion 30, that will stay at a height, with respect to the bottom 2 of the main tank 1, lower than the minimum level of the molten salts required to guarantee the MPSH over the pump impeller.

When the molten salts level in the main tank 1 will approach the level required to guarantee the MPSH over the pump impeller, the level of molten salts inside the secondary tank 17 will be minimum and substantially corresponding to the height of the openings in the bottom part of said vessel 16, secondary tank 17 or compartment 20 (FIG. 8).

When the molten salts level in the main tank 1 will be maximum, the level in the secondary tank 17 will reach its maximum to a level which depends on the value of the second pressure set point.

If the second pressure set point has a value close to the first pressure set point value, when the molten salts level in the main tank 1 will be maximum, then the secondary tank 17 and part of the pipe 8 connecting it to the inert gas supply and vent system 21 will be full of molten salts (FIG. 8a). When the main tank 1 will be "emptied", that is when the molten salts are sucked from the main tank 1, nitrogen will be admitted in the secondary tank 17, through the pipe 8, by the first controller 22.

The level of molten salts inside the pipe 8 which connects the secondary tank 17 to the inert gas supply and vent system 21 is indicated in FIGS. 8a and 8b with the label "LS".

Accordingly, if the second pressure set point has a value close to the first pressure set point value, when the molten salts level will raise in the main tank 1, nitrogen will be vented out by the second controller 23.

If the second pressure set point has a value close to the pressure generated by the molten salts level corresponding to the maximum level of the molten salts in the main tank 1, when the molten salts level in the main tank 1 will be maximum, the secondary tank 17 will be partially filled with molten salts while the gas pressure will be increased up to the second pressure set point and very little nitrogen will be vented (FIG. 8*b*).

Accordingly, when the main tank 1 will be "emptied" the nitrogen inside the secondary tank 17 will expand, the level of molten salts inside them will reach its minimum and very little nitrogen will be admitted in the secondary tank 17 through the pipe 8, by the first controller 22.

A different scheme of working of the inert gas supply and vent system is outlined in FIG. 9. According to this scheme, the secondary tank 17, or vessel 16 or compartment 20, of two, or more, main tanks 1 are connected among them so that the gas cushions (30) of the element (5) of each tank (1) share a common gas supply and vent system 21'. Advantageously, the two main tanks 1 are connected by means of a molten salts circuit 24 for transferring the molten salt from a first of said two main tanks 1 to the second one and vice versa.

With reference to FIG. 9, the supply and vent system 21' will have the first pressure set point (i.e. the threshold for the gas admission) set to a value such that it maintains the gas pressure inside each secondary tank 17 and the respective pipe 8 which connect them to the gas supply and vent system 21' close to the pressure generated by the molten salts level corresponding to the level required to guarantee the MPSH over the pump impeller in each of the main tanks 1.

The second pressure set point (i.e. the threshold for nitrogen venting) will be set at a pressure value above the first pressure set point and below the value of the pressure generated by the molten salts level corresponding to the maximum level of the molten salts in the main tank 1.

This common supply and vent system 21' combines the advantage of a very low nitrogen consumption as well as the full availability of the volume of each of the secondary tanks 17 for the storage of molten salts when the respective main tank 1 is full of molten salts.

A specific advantage of the present invention is the flexible use of the vessel 16, secondary tank 17 or compartment 20, which is used, partially or fully, to store molten salts when the main tank 1 fills up, which molten salts, however, are available for heat transfer when the tank empties.

It has been found that the present invention achieves the posed scopes, namely the tank according to the present invention allows to minimize the amount of molten salts (liquid) unusable as heat transfer storage medium, while assuring the proper operation of the aspiration pump used to suck them from the tank. In particular, the at least one element provided inside the tank so that at least part of its volume is arranged below the minimum level corresponding to the minimum positive suction head required by aspiration pump displaces a corresponding volume of liquid, i.e. molten salts, making it available to the pump, and, at the same time assures the maintenance of said minimum level.

The following examples are provided for purely illustrative purposes of the present invention and should not be considered as limiting its protection scope as indicated in the enclosed claims.

Example 1

State of the Art

A CSP plant requires the installation of a heat storage system of 1000 MWh capacity to be stored in 8 hours.

To satisfy these heat storage capacity requirements, a heat storage system according to the state of the art consists of a hot and a cold tanks each containing a molten salts mixture of 39÷41% $KNO_3$ and 59÷61% of $NaNO_3$ having an average specific heat capacity of 1.50 kJ/kg·° K. and an average density of 1.87 kg/m³ at a temperature range between 290° C. and 390° C. The temperature of the cold tank equals to 290° C. and the temperature of the hot tank equals to 390° C.

Such a heat storage system requires 24,000 tons of the molten salts mixture freely transferable from one tank to the other, with a flow rate of 3,000 ton/hour.

The arrangement selected requires 2 pumps for which the manufacturers usually require a net positive suction head of 5.0-5.2 m of liquid column corresponding to a molten salts level above the pump impeller of 0.70 m which includes also a margin in order to always assure a net positive suction head higher than required one. Since the upper part of the impeller is located at 0.3 m with respect to bottom of the molten salts tanks, a ML of 1.0 m is thus necessary.

Tank height is determined by evaluation of several factors as soil bearing capacity, liquid (molten salts) density, liquid (molten salts) inventory, pump shaft length, etc. and it is defined considering mechanical design (wall thickness) along with foundation design.

Then, given a soil bearing capacity of 15 tons/m² and considering the weight of the molten salts tank itself, the height of the molten salts in each tank is approximately limited to 14÷15 m which represents the best technical and economic arrangement.

Therefore, each tank will have a diameter of 38 m and a maximum level of molten salts of 13.2 m for a total volume of 14,970 m³ corresponding to 27,995 tons of molten salts, with a quantity, for each tank, of 2,120 tons of molten salts, equivalent to 1,135 m³ corresponding to the ML requirement, which will not be available to be transferred by the pumps.

Example 2

For satisfying the same heat storage capacity requirements of the CSP plant described in Example 1 a heat storage system comprising two heat storage tanks according to the present invention was designed.

Each tank was equipped with the same number and type of pumps of the tanks used in the heat storage system of Example 1.

Figure 1A:
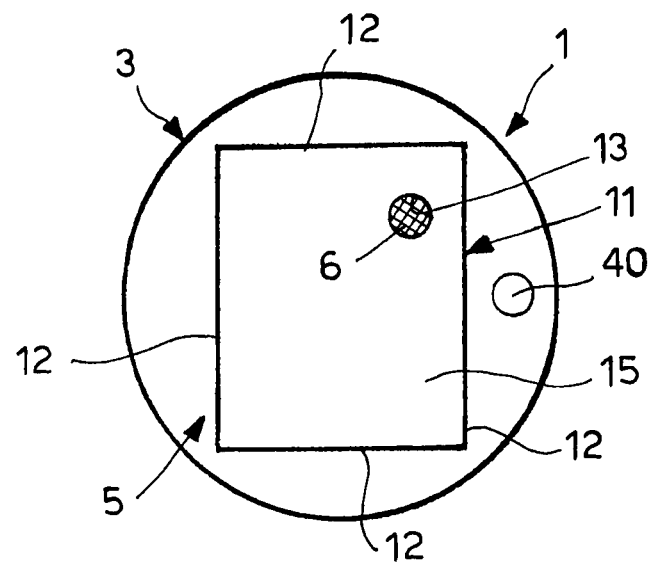
FIG. 1*a* is a schematic horizontal section view of the tank of FIG. 1 along the plane I-I.

Each tank according to the present invention provided for an element consisting of a cylindrical containment body, fixed to the bottom of the tank, containing a mass of inert material of the type shown in FIGS. 1-1*a*.

The diameter of the containment body was 28 m and its height was 1.0 m, the total volume occupied being thus 616 m³.

A grid was used as upper side confinement on top of the inert material. The grid was welded to the lateral confinement of the containment body.

The inert material consisted of a layer of silica sand having a height of 0.6 m and a void fraction (defined as void volume divided by total volume) of 0.15. On top of the silica sand layer a layer of quartzite crushed rock having a height of 0.40 m and void fraction of 0.10 was overlapped.

Therefore, in each tank the total volume occupied by the element, that could not be occupied by the molten salts, was 536 m³. This volume is equivalent to 1,002 tons of molten salts that do not need to be purchased and loaded in each tank according to the present invention.

By comparison with Example 1 (state of the art), the heat storage capacity of the same CSP plant is, therefore, satisfied using a reduced amount of molten salts.

Example 3

A heat storage system comprising two heat storage tanks according to the present invention was designed for satisfying the same heat storage capacity requirements of the CSP plant described in Example 1.

Each tank was equipped with the same number and type of pumps of the tanks used in the heat storage system of the state of the art.

Each tank according to the present invention comprised an element placed inside the tank, fixed to bottom of the tank, consisting of a containment body filled with gaseous nitrogen. The containment body was a cylindrical tank (secondary tank) not having any opening that puts its inner volume in communication with the mass of molten salts contained in the main tank.

Nitrogen was supplied to each secondary tank by an external supply and vent system connected to the secondary tank through a pipe.

The diameter of each secondary tank was 28 m and its height was 1.0 m. The total volume occupied by each secondary tank was 616 m³ corresponding to additional 1,152 tons of molten salts which do not need to be procured, melted and loaded into each tank.

The thickness of the secondary tank wall was calculated in accordance with ASME VIII div. 1 and approximately results in 12 mm.

The lateral confinement walls of the secondary tank was directly welded to the floor of the main tank containing the molten salts, thus avoiding the use of a separate floor for the secondary tank.

The tank roof had a thickness approximately of 12 mm and beams were used as reinforcement.

By comparison with Example 1 (state of the art), the heat storage capacity of the same CSP plant is, therefore, satisfied using a reduced amount of molten salts, which is for each tank equal to 616 m³ (1,152 tons).

Example 4

A heat storage system comprising two heat storage tanks according to the present invention was designed for satisfying the same heat storage capacity requirements of the CSP plant described in Example 1.

Each tank was equipped with the same number and type of pumps of the tanks used in the state of the art.

Each tank according to the present invention comprised an element consisting of a compartment filled with gaseous nitrogen.

Nitrogen was supplied to each compartment by an external supply and vent system connected to the compartment through a pipe.

Each compartment presented openings, in its lower part, to allow the free flow of the molten salts contained in the main tank inside the inner volume of the compartment.

Each compartment had cylindrical form with a diameter of 28 m and a height of 1.0 m. The total volume occupied by the compartment was 616 m³.

The thickness of the compartment wall was 12 mm.

The compartment wall was directly welded to the floor of each molten salts tank.

Each compartment was equipped with openings which were 1 m wide and 0.10 m high. The openings were made with a pitch of 3 m on the lower side of the compartment wall.

Each compartment roof had a thickness of 12 mm and beams and rafters were used as reinforcement.

In the nitrogen pressure regulation scheme of the hot molten salts tank a first pressure set point for the inlet controller of 0.13 bar g was selected, which corresponded to a molten salts level inside the main tank of 1.0 m; as second pressure set point for the vent controller, a pressure of 0.20 bar g was selected, which is just slightly above the first pressure set point.

When the level of the molten salts in the hot tank was minimum, the level inside the compartment was 0.25 m just enough to maintain the liquid level over the opening height avoiding that inert gas bubbling through the openings of the compartment. Therefore the volume occupied by the gas cushion, in each tank, when the tank level is low is equal to 462 m³ corresponding to 865 tons of molten salts that are additionally made available for being pumped in each tank according to the present invention.

Furthermore 983 tons of molten salts do not need to be procured, melted and loaded into each tank, thus reducing accordingly the total volume and height the tank with reference to the state of the art.

By comparison with Example 1 (state of the art), the heat storage capacity of the same CSP plant is, therefore, satisfied using a reduced amount of molten salts and also using tanks having a smaller volume.

Example 5

In the same heat storage system of Example 4 the two secondary tanks were connected so that the gas cushions defined by the secondary tanks would share a common gas supply and vent system (as outlined in FIG. 9).

The hot and cold tanks were connected by means of a molten salts circuit for transferring the molten salts from the hot tank to the cold tank and vice versa.

The heat storage systems was operated using a common nitrogen pressure regulation scheme for both hot and cold tanks, in which a first pressure set point for the inlet controller of 0.13 bar g was selected, which corresponded to a molten salts level inside the main tank of 1.0 m, while as second pressure set point for the vent controller, a pressure of 0.20 bar g was selected, which is close to the first pressure set point.

When the level of molten salts was minimum in the first tank, the level inside its inner compartment (first compartment) was 0.25 m, which was the same as in the example 4, since the nitrogen contained in the first compartment flowed to the second compartment of the second molten salts tank. Therefore the volume occupied by the gas cushion, in each tank, when the tank level is low, is equal to 462 m³ corresponding to 865 tons of molten salts that are additionally made available for being pumped in each tank according to the present invention.

Each time the hot secondary tank is emptied a total of 190 Nm³ of nitrogen needs to be admitted in the compartment. Assuming that 300 cycles per year are carried out and that in each cycle the nitrogen is vent out, the total consumption per year of nitrogen would be 57,000 Nm³.

By allowing nitrogen to flow from the hot tank to the cold one such as in the heat storage system of the present example, the gas consumption per year, which is mainly due to the temperature difference between the two tanks, is reduced to 24,900 Nm³.

By comparison with Example 1 (state of the art), the heat storage capacity of the same CSP plant is, therefore, satisfied using a reduced amount of molten salts and, consequently, using tanks having a smaller volume, while minimizing the nitrogen consumption for each filling operation.

The invention claimed is:

1. A tank for containment of a liquid, said tank comprising:
   a bottom;
   a lateral wall extending from the bottom;
   a pump having an inlet in fluid communication with the tank;
   at least one element occupying a volume disposed within the tank;
   a gas supply and vent system in fluid communication with the at least one element; and
   a controller of the gas supply and vent system configured to vary a level of the liquid inside the at least one element based on a level of the liquid inside the tank but outside the at least one element,
   wherein said pump requires a minimum level of the liquid in said tank for operating, and
   wherein at least a portion of said volume is arranged at a height, with respect to said bottom, which is lower than said minimum level.

2. The tank according to claim 1, wherein said at least one element includes a containment body containing a mass made of a material which is chemically inert with respect to said liquid.

3. The tank according to claim 2, wherein said containment body includes at least one opening that effects communication between an inner part of said containment body and an inner part of said tank.

4. The tank according to claim 1, wherein said at least one element includes a containment body filled with a fluid.

5. The tank according to claim 4, wherein said fluid is a gas and said containment body is connected to the gas supply and vent system.

6. The tank according to claim 1, wherein said at least one element includes a gas cushion of variable volume.

7. The tank according to claim 6, wherein said gas cushion is a vessel, a secondary tank, a compartment, or a combination thereof,
   wherein the gas cushion is located inside said tank,
   wherein a portion of the gas cushion in proximity to a bottom of the gas cushion communicates with an inner part of said tank,
   wherein a portion of the gas cushion in proximity to a top of the gas cushion communicates with the gas supply and vent system, and
   wherein the gas supply and vent system varies a pressure inside said vessel, said secondary tank, or said compartment, such that the pressure is higher than or equal to a pressure of a gas phase inside said tank.

8. A plant comprising two or more tanks according to claim 7, wherein said gas cushions of each tank share a common gas supply and vent system.

9. The plant according to claim 8, further comprising at least a first tank and a second tank connected to each other by a molten salts circuit for transferring the liquid from the first tank to the second tank and vice-versa.

10. The tank according to claim 1, wherein said at least one element includes a mass made of a material which is chemically inert with respect to said liquid.

11. The tank according to claim 1, wherein an area of said at least one element in cross-section with respect to the vertical axis of said tank is smaller than a corresponding cross-section area of said tank.

12. A heat storage system comprising at least one tank according to claim 1.

13. A plant comprising two or more tanks according to claim 1.

14. The tank according to claim 1, wherein the liquid is a molten salt.

15. The tank according to claim 1, wherein a top of the at least one element is disposed below a maximum level of the liquid within the tank, with respect to the bottom.

16. A method of storing heat in a tank, the tank including
   a pump having an inlet in fluid communication with the tank,
   at least one element occupying a volume disposed within the tank, and
   a gas supply and vent system in fluid communication with the at least one element, the method comprising:
   supplying a liquid to the tank;
   varying, via the gas supply and vent system, a level of the liquid inside the at least one element based on a level of the liquid inside the tank but outside the at least one element;
   arranging at least a portion of said volume of said at least one element at a height, with respect to a bottom of said tank, which is lower than a minimum level of the liquid required in said tank for operating.

* * * * *